(12) United States Patent
Brown

(10) Patent No.: US 6,922,160 B1
(45) Date of Patent: Jul. 26, 2005

(54) SCALABLE BUS SYSTEM AND METHOD FOR COMMUNICATING DIGITAL DATA USING ANALOG MODULATION AND DEMODULATION

(75) Inventor: Jeffrey O. Brown, St. Paul, MN (US)

(73) Assignee: Unisys Corporation, Blue Bell, PA (US)

(*) Notice: Subject to any disclaimer, the term of this patent is extended or adjusted under 35 U.S.C. 154(b) by 296 days.

(21) Appl. No.: 10/268,242

(22) Filed: Oct. 9, 2002

(51) Int. Cl.$^7$ ................................................ H03M 1/00
(52) U.S. Cl. ........................ 341/110; 341/144; 341/126
(58) Field of Search .................................. 341/110, 126, 341/144, 155, 44; 370/342; 375/285, 242, 365

(56) References Cited

U.S. PATENT DOCUMENTS

| | | | | |
|---|---|---|---|---|
| 5,936,997 A | * | 8/1999 | Kanda | 375/144 |
| 6,163,573 A | * | 12/2000 | Mihara | 375/240.02 |
| 6,272,181 B1 | * | 8/2001 | Matt | 341/141 |
| 6,366,570 B1 | * | 4/2002 | Bhagalia | 370/342 |
| 6,408,034 B1 | * | 6/2002 | Krone et al. | 375/285 |
| 6,567,023 B1 | * | 5/2003 | Iwata | 341/126 |

* cited by examiner

Primary Examiner—Michael Tokar
Assistant Examiner—Lam T. Mai
(74) Attorney, Agent, or Firm—Charles A. Johnson; Mark T. Starr; Steven Funk, Crawford Maunu PLLC (57) ABSTRACT

A method and apparatus for communicating digital data on a bus arrangement is provided. The bus arrangement includes one or more encoding circuits, decoding circuits, and transmission mediums. Each encoding circuit includes a digital-to-analog converter circuit communicatively coupled to a multi-phase analog encoding circuit. Each decoding circuit corresponds to a respective encoding circuit and includes a multi-phase analog decoding circuit communicatively coupled to an analog-to-digital converter circuit, and a multiplexing circuit communicatively coupled to the analog-to-digital converter circuit. Each respective encoding circuit and a corresponding decoding circuit is communicatively coupled by a transmission medium. Digital data is converted to at least one analog signal and encoded upon a radio frequency carrier signal. The carrier signal is transmitted to a destination where it is decoded and the digital data reconstituted.

34 Claims, 9 Drawing Sheets

SCALABLE BUS SYSTEM AND METHOD FOR COMMUNICATING DIGITAL DATA USING ANALOG MODULATION AND DEMODULATION

FIELD OF THE INVENTION

The present invention relates to digital communications systems, and more specifically to busing arrangements using analog modulation and demodulation.

BACKGROUND OF THE INVENTION

Computer arrangements and complex circuits are often designed as a plurality of functional units, or modules, interconnected by digital data communications paths. Each functional unit processes data, and transmits/receives data to/from other functional units for additional data manipulations. Data packets in large and small quantities are communicated between functional units, for example, between individual discrete circuits, between integrated circuits on a common chip, or between remotely located circuits coupled to or within various parts of a system or subsystem. A typical digital-data path is implemented in various forms, including a cable, a backplane circuit, one or more printed circuit board (PCB) traces, a bus structure internal to a chip, other interconnect, or any combination of such communication media. Regardless of the configuration, the communication typically requires closely controlled interfaces that are designed to ensure that data integrity is maintained. Circuit designs and data communication paths are sensitive to practicable limitations in terms of implementation space and available operating power. An increased demand for high-speed electronic devices must address not only performance of the functional units themselves, but also the speed and efficiency requirements by which data is passed between the functional units.

Serial data communication transmits data bits across a communication path, one information unit after another. Other high-speed communication applications are implemented using parallel data channels, or buses, in which multiple data bits are simultaneously sent across parallel communication paths. However, implementing parallel communication paths use up more area than a single (i.e., serial) data path. Area is a valuable commodity in some applications. In a parallel communication scheme, a transmitting module transmits data over the parallel bus synchronously with a clock from the transmitting module. In this manner, the transitions on the parallel signal lines leave the transmitting module in a synchronous relationship to each other and/or to a clock on the transmitting module. In such systems, the received signals (and where applicable, the receive clock) should have a specific relative phase relationship in order to provide proper data recovery. However, the length of the clock signal path and data signal paths must be closely controlled so that the propagation delay of each respective signal, relative to one another, does not interfere with the intended signal phase relationships. In addition, clock signal path distance is typically limited to confine clock signal "skew" effects within tolerable limits; therefore, a clock domain generally correlates with a compact geographical region of a circuit or system. Generally as clock speeds increase, the signal phase relationship margins to accommodate signal path differences decrease, thus mandating even closer signal path tolerances. For similar reasons, the geographical region correlating to a clock domain shrinks as clock frequency increases.

Frequently, functional units each operate using their own clock domain; therefore, a data-transmitting module might be operating in one clock domain at a first clock frequency, while a data-receiving module is operating in another clock domain at a different (and perhaps non-synchronous) second clock frequency. Additional data buffer circuitry is necessary to interface parallel communications between clock domains.

A method and apparatus that improves upon the aforementioned physical busing characteristics, as well as addresses other related variables, are therefore desirable.

SUMMARY OF THE INVENTION

In various embodiments, the invention provides a method and apparatus for communicating digital data across a bus arrangement.

According to a general embodiment of a bus arrangement of the present invention, digital data on a bus arrangement is converted to at least one analog signal and encoded upon a carrier signal. The carrier signal is transmitted to a destination where it is decoded and the digital data reconstituted.

According to one exemplary embodiment of the present invention, a bus arrangement has one or more analog encoding circuits, one or more analog decoding circuits, and one or more transmission mediums. As will be appreciated by those skilled in the relevant art, "analog" encoding and decoding circuits encode data onto an analog carrier signal and decode an analog signal to recover the data. Each encoding circuit includes a digital-to-analog converter circuit communicatively coupled to a multi-phase analog encoding circuit. Each decoding circuit corresponds to a respective encoding circuit and includes a multi-phase analog decoding circuit communicatively coupled to an analog-to-digital converter circuit, and a multiplexing circuit communicatively coupled to the analog-to-digital converter circuit. Each respective encoding circuit and a corresponding decoding circuit is communicatively coupled by a transmission medium.

According to another exemplary embodiment of the present invention, a computing arrangement includes a bus arrangement, as summarized above, communicatively coupled between a first processing unit and a second processing unit.

According to yet another exemplary embodiment of the present invention, a method of communicating n-bit digital data across a computer's internal bus arrangement includes converting the n-bit digital data into a representative analog modulating signal, modulating an analog carrier signal (e.g., a radio frequency (RF) signal) using the representative analog modulating signal, transmitting the modulated analog carrier signal to a remote end of the bus arrangement and demodulating the analog carrier signal at the remote end. The representative analog modulating signal is recovered from the demodulated analog carrier signal and the n-bit digital data is reconstituted from the representative analog modulating signal, n being a positive integer.

According to another exemplary embodiment of the present invention, a method of communicating n-bit digital data received at a bus arrangement includes parsing the digital data into a plurality of portions, converting each portion into a corresponding analog modulating signal, modulating an analog carrier signal (e.g., an RF signal) using the corresponding analog modulating signals, and transmitting the modulated analog carrier signal to a remote end of the bus arrangement. At the remote end, the modulated analog carrier signal is demodulated and each corresponding analog modulating signal is recovered from the demodulated analog carrier signal. Each corresponding analog modulating signal is converted to a respective digital data portion, and the respective digital data portions are multiplexed to form m-bit digital data, n and m being positive integers.

According to a final exemplary embodiment of the present invention, a bus arrangement for communicating n-bit digital data to a remote end includes means for parsing the digital data into a plurality of portions, means for converting each portion into a corresponding analog modulating signal, means for modulating an analog carrier signal (e.g., an RF signal) using the corresponding analog modulating signals, means for transmitting the modulated analog carrier signal to a remote end of the bus arrangement, means for demodulating the analog carrier signal at the remote end, means for recovering each corresponding analog modulating signal from the demodulated analog carrier signal, means for converting each corresponding analog modulating signal to a respective digital data portion, and means for multiplexing the respective digital data portions to form m-bit digital data, n and m being positive integers.

The above summary of the present invention is not intended to describe each disclosed embodiment of the present invention. The figures and detailed description that follow provide additional exemplary embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

In various embodiments, the invention provides a mechanism for communicating digital data across a bus arrangement. Computing arrangement buses are limited in their ability to transfer data by the bandwidth of the physical interconnect. Metallic conductor and printed circuit board (PCB) dielectric signal losses increase as frequency of the signal increases; therefore, signals are increasingly attenuated as bus speeds increase. In order to achieve even higher data rates, either the data must be compressed into a more bandwidth-efficient form, or the physical conductor must be modified in some way to increase its bandwidth, or some combination of change to both data form and physical path are required.

Increasing the physical size of a metallic conductor consumes valuable space, as does using multiple parallel data communication paths versus a single (e.g., serial) data path. Converting a bus from a metallic interconnection to fiber optic increase the available bandwidth for a given space; however, the accompanying change in materials from silicon to optical semiconductors increases costs, reduces density and must still overcome the bandwidth limitations of the input/output (I/O) drivers.

According to a general embodiment of a bus arrangement of the present invention, digital data on a bus arrangement is converted to at least one analog signal, and encoded upon a carrier signal. The carrier signal is transmitted to a destination where it is decoded and re-constituted back into digital data. The bus arrangement of the present invention can be implemented in various configurations such as a computer bus, backplane, or crossover switch, among others. The bus arrangement of the present invention uses a bandwidth-efficient analog coding technique, generally having more than two states, to increase the data rate over binary (i.e., digital) encoding schemes for a given bus bandwidth.

According to one exemplary embodiment of the present invention, a bus arrangement has N encoding circuits, N decoding circuit and N transmission mediums, N being a positive integer. Each encoding circuit includes a digital-to-analog converter circuit communicatively coupled to a multi-phase analog encoding circuit. Each decoding circuit corresponds to a respective encoding circuit and includes a multi-phase analog decoding circuit communicatively coupled to an analog-to-digital converter circuit, and a multiplexing circuit communicatively coupled to the analog-to-digital converter circuit. Each respective encoding circuit and a corresponding decoding circuit is communicatively coupled by a transmission medium.

Figure 1A:
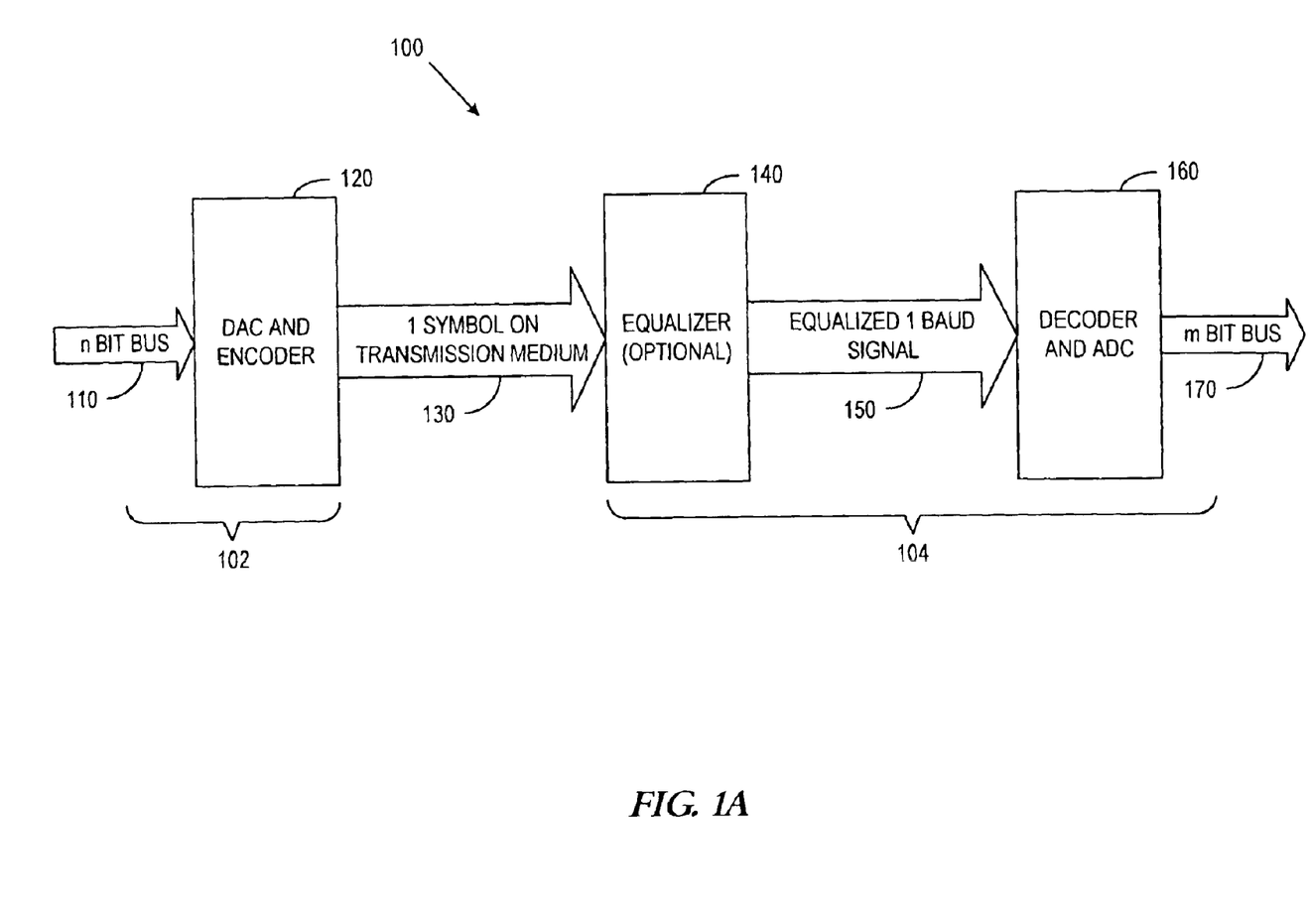
FIG. 1A is a block diagram that illustrates a unidirectional busing arrangement, according to an exemplary embodiment of the present invention.

FIG. 1A is a block diagram that illustrates a unidirectional bus arrangement 100, according to an exemplary embodiment of the present invention. Bus arrangement 100 receives n-bit digital data, transmits information contained therein, and outputs the information as m-bit data. Generally, m is equivalent to n; however they need not be identical. Bus arrangement 100 includes a transmitting portion 102 and a receiving portion 104. Transmitting portion 102 includes an input digital bus portion 110 coupled to an analog encoding circuit 120. Input digital bus portion 11o is n bits wide. Analog encoding circuit 120 includes a digital-to-analog converter and analog encoder. Analog encoding circuit 120 is communicatively coupled to an unequalized transmission medium 130, which in turn is communicatively coupled to receiving portion 104.

Receiving portion 104 optionally includes an equalizer 140 communicatively coupled to an analog decoding circuit 160 via an equalized transmission medium 150. Equalizer 140 compensates for the frequency dependent attenuation of a signal carried by unequalized transmission medium 130 due to the nature of the communication medium. When a signal is transmitted via unequalized transmission medium 130 (e.g., a PCB conductor, or coaxial cable, or backplane trace, etc.), the signal is attenuated. This is a result of the movement of electrons in a metal conductor or semiconductor material as the electromagnetic signal wave propagates. Some of the electrical energy of the signal is converted into heat of friction caused by the electron movement. The electrons of relatively higher frequency waves move back and forth more times per unit of time, generating more friction, and greater heat loss. Thus, relatively higher frequency signal waves are attenuated to a greater degree than relatively lower frequency signal waves. Signal attenuation is therefore, frequency dependent.

An equalizer compensates for the greater signal attenuation at higher frequencies. One exemplary equalization method intentionally attenuates the low frequency components of a signal to "flatten" out the frequency response of the combination of the unequalized transmission medium 130 and equalizer 140. The amount of compensatory attenuation is generally dependent on the particular unequalized transmission medium 130 and signal characteristics.

Generally, equalized transmission medium 150 will be relatively more closely controlled to maintain signal equalization than unequalized transmission medium 130, for example by being of a relatively shorter distance or greater physical capacity. However, bus arrangement 100 may alternatively be designed with transmission medium pre-equalization where equalizer 140 functions to intentionally attenuate the low frequency components of a signal before, or soon after, it enters a transmission medium to "pre-flatten" out the frequency response of a signal in compensation for other signal attenuation that will occur across the subsequent equalized transmission medium 130. For implementations of the present invention that do not opt to utilize equalizer 140, analog encoding circuit 120 is communicatively coupled to analog decoding circuit 160 through unequalized transmission medium 130. Analog decoding circuit 160 includes an analog decoder communicatively coupled to an analog-to-digital converter. An output digital bus portion 170 is communicatively coupled to analog decoding circuit 160. Output digital bus portion 170 is m-bits wide. Unequalized transmission medium 130 (and optionally, equalized transmission medium 150) is typically a metallic conductor, such as copper, aluminum, or other alloy such as used in PCB traces. The transmission medium may be incorporated into a PCB, such as being a trace on a computing system backplane, or motherboard, for example.

Equalizer 140 is an equalization circuit. According to one exemplary implementation, equalizer 140 is a simple lead-lag filter with an attenuation slope that is approximately inverse of the skin effect attenuation of unequalized transmission medium 130. Equalizer 140 may also be designed to "pre-compensate" for the attenuation of equalized transmission medium 150 and located nearer encoding circuit 120, than decoding circuit 160. According to another exemplary implementation, equalizer 140 implements more complex adaptive equalization. Equalizer 140 is alternatively implemented as any type of frequency dependent compensation circuitry to effectuate partial or complete attenuation compensation for the transmission media of the particular application.

According to one particular exemplary implementation, digital data is received in parallel by bus arrangement 100 via input digital bus portion 110. The digital data is converted to a representative analog signal and encoded upon a carrier using a quadrature amplitude modulation (QAM) technique such that n-bits of digital data are represented into one analog "symbol" for transmission via unequalized transmission medium 130, n being a positive integer. The rate of transmission of the analog symbols is expressed in terms of "baud," one baud being equivalent to one analog "symbol" per second. Where encoding circuit 120 is a QAM $2^n$ encoder as described above, each analog "symbol" must be capable of encoding $2^n$ possible states. For example, where bus arrangement 100 carries 8 bit digital data, encoding circuit 120 is a QAM $2^8$, or QAM 256, encoder capable of 256 possible encoded states.

At the receiving end of bus arrangement 100 (i.e., receiving portion 104) of the present implementation, decoding circuit 160 is a QAM 256 decoder, decoding the 256 possible analog encoded states and converting the information into an m-bit digital data representation, where m is typically equal to n. As illustrated in FIG. 1A, assuming bus arrangement 100 receives and communicates 8-bit data (i.e., n equals 8), the decoded analog data is converted back to 8-bit parallel data and communicated from bus arrangement 100 via digital bus portion 170. In this manner, the transformation to/from analog signals within bus arrangement 100 is transparent to a data source coupled to input digital bus portion 110 and a data destinations coupled to digital bus portion 170. According to a more particular exemplary embodiment of the present invention, bus arrangement 100 is implemented in one or more application specific integrated circuits (ASIC), for example transmitting portion 102 is implemented as a transmitting ASIC communicatively coupled to receiving portion 104, implemented as a receiving ASIC, via unequalized transmission medium 130 such as a backplane trace.

According to one particular implementation of the present invention, bus arrangement 100 is arranged and configured within a mainframe computing system to communicatively couple a processor with a memory arrangement.

Figure 1B:
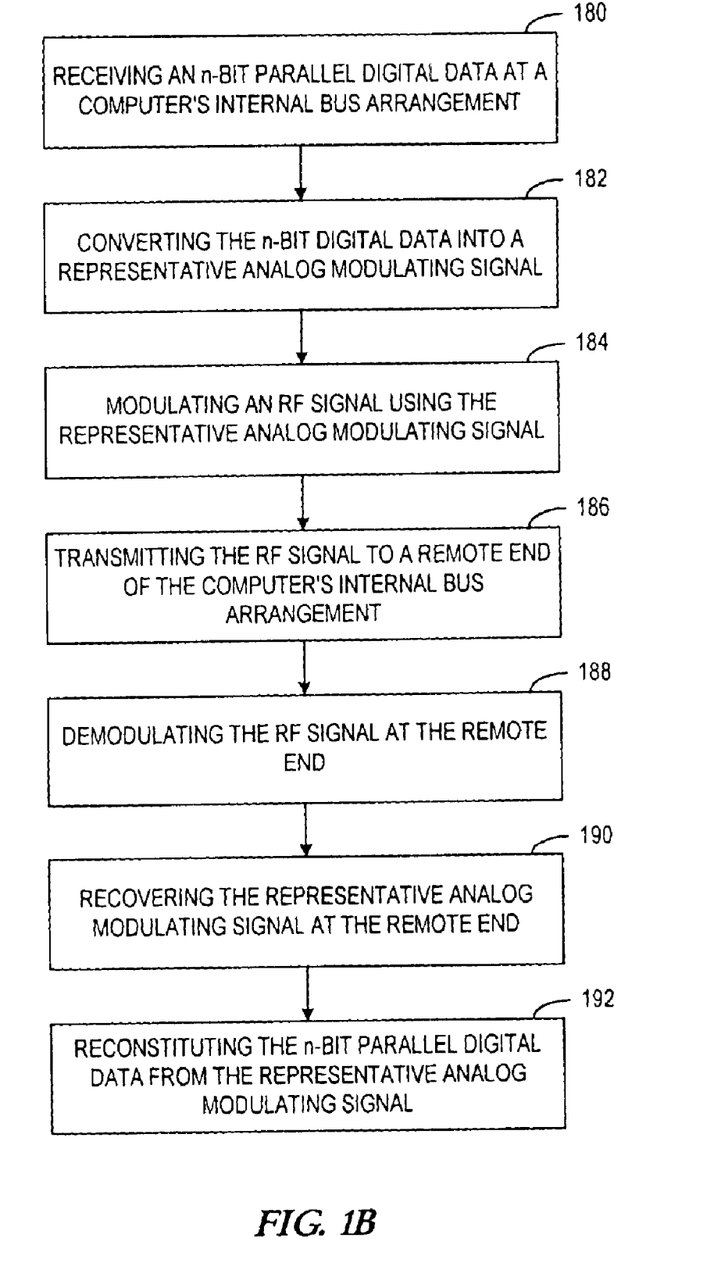
FIG. 1B is a flowchart of a process for communicating digital data across an internal computer bus arrangement using intermediate analog encoding and decoding, according to an exemplary embodiment of the present invention.

FIG. 1B is a flowchart of a process for communicating digital data across a computer's internal bus arrangement. First, n-bit digital data is received at the computer's internal bus arrangement (step 180), n being a positive integer. The n-bit digital data is converted into a representative analog modulating signal (step 182). An analog carrier signal is modulated using the representative analog modulating signal (step 184). In this example embodiment, the analog carrier is an radio frequency (RF) signal; however, other frequency spectrum carrier signals are contemplated by this invention, e.g., microwave, intermediate frequency, low frequency, light spectrum signals, etc. The modulated RF carrier signal is transmitted to a remote end of the computer's internal bus arrangement (step 186). At the remote end of the computer's internal bus arrangement, the RF signal is demodulated (step 188) and the representative analog modulating signal is recovered (step 190). The n-bit parallel digital data is reconstituted from the representative analog modulating signal (step 192).

Figure 2A:
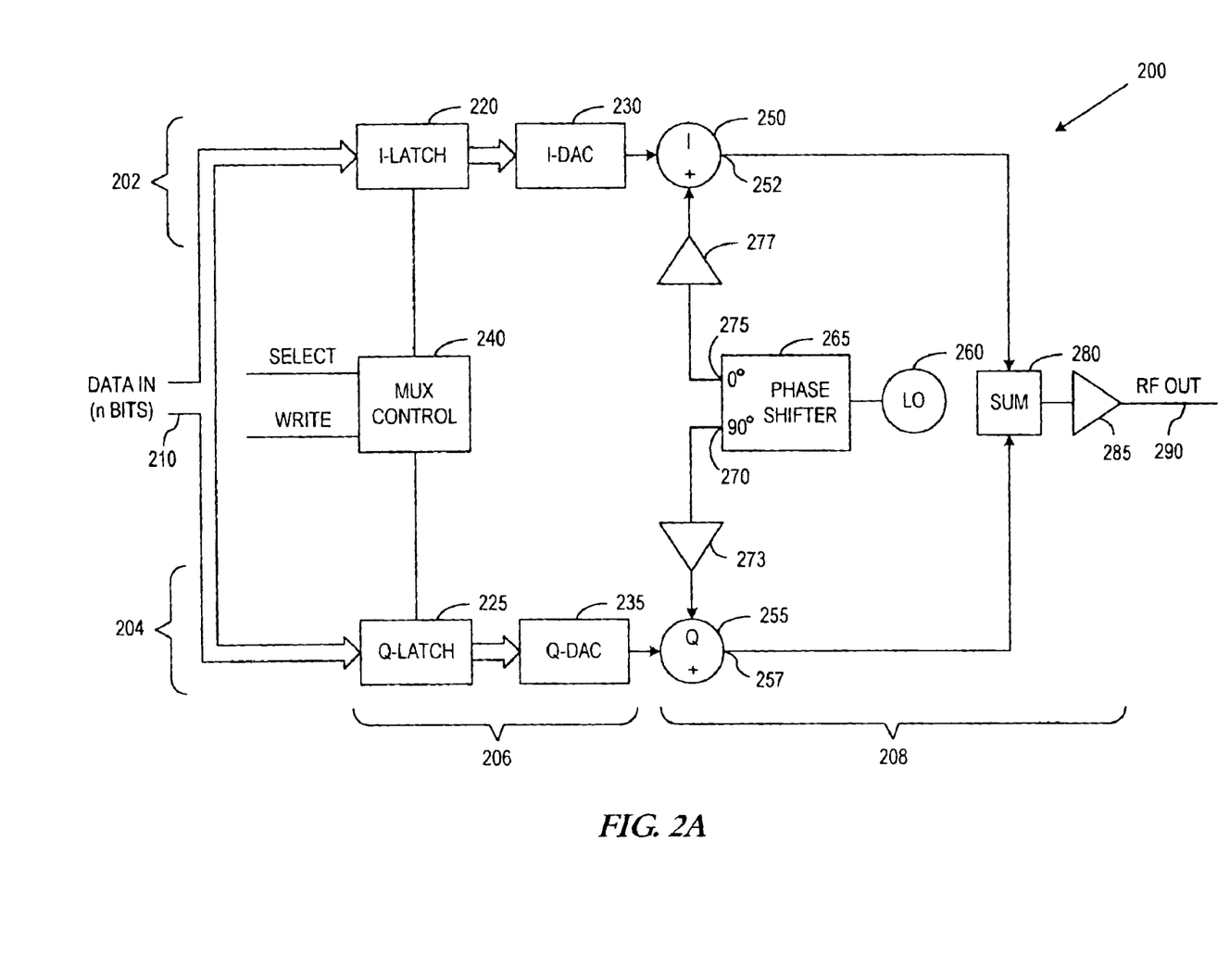
FIG. 2A is a block diagram that illustrates a digital-to-analog converter and encoder, according to an exemplary embodiment of the present invention.

FIG. 2A is a block diagram that illustrates an analog encoding circuit 200, according to an exemplary embodiment of the present invention. Encoding circuit 200 includes a digital-to-analog converter portion 206 and an analog encoder (portion) 208. According to one exemplary implementation, the analog encoder uses QAM (as described above), orthogonal frequency division multiplexing (OFDM), or some other bandwidth-efficient coding scheme. OFDM is an analog signal encoding technique similar to QAM except that orthogonal carriers, rather than orthogonal amplitudes, are used to encode data.

A general frequency division multiplexing technique adds together modulated carriers of different frequencies to form a composite signal. Carriers are spaced sufficiently apart in frequency so that they may be subsequently separated out from the composite signal on the receiving end of a transmission. Each carrier is independently modulated prior to forming the composite frequency division multiplexed signal. For example, a carrier is modulated according to the value of a corresponding bit of a parallel data bus. Effectively, the information of multiple digital data bits is multiplexed into a single analog (carrier) signal.

However, frequency division multiplexing is constrained by spacing and/or overlap of adjacent frequency carrier signals. Spacing the carriers too far apart in frequency uses up too much of the frequency spectrum and increases bandwidth requirements. Spacing the carriers too close together in frequency overlaps the signals and increases interference between the various signals.

Bandwidth in a frequency division multiplexing scheme can be minimized by encoding the data using QAM first, and then further modulating each successive QAM "symbol." OFDM has the advantage over QAM of being more tolerant of frequency dependent attenuation. The many different carrier frequencies used in OFDM act like individual narrow frequency band channels, each channel being so narrow in frequency that the attenuation differences are negligible within the channel.

Continuing on with FIG. 2A assuming 8-bit input data (i.e., n equals 8) and QAM 256 encoding for purposes of illustration, encoding circuit 200 includes an in-phase channel 202 and a quadrature channel 204. Considering first in-phase channel 202, input digital bus portion 210 is communicatively coupled to an in-phase latching circuit 220 which latches the digital data. Latching circuit 220 is 4-bits wide for a QAM 256 encoder (the other four of bits of the 8-bit input data are processed by the quadrature channel 204). Latching circuit 220 is further communicatively coupled to an in-phase digital-to-analog converter (I-DAC) circuit 230 which converts the 4 latched bits to an analog signal. The output of the I-DAC has $2^{(n/2)}$ possible output levels, in this case 16 possible output levels for the 4 input bits. I-DAC is communicatively coupled to an in-phase analog mixer 250. According to a more particular aspect, analog mixer 250 is a double balanced mixer. The analog signal output of the I-DAC is differential and used as the modulation in double balanced mixer 250.

The quadrature-phase channel 204 is constructed and operates similarly to the in-phase channel 202. Input digital bus portion 210 is communicatively coupled to a quadrature-phase latching circuit 225 that latches the digital data. Latching circuit 225 is also 4-bits wide for a QAM 256 encoder (the other four of bits of the 8-bit input data not being latched by the in-phase channel). Latching circuit 225 is further communicatively coupled to an quadrature-phase digital-to-analog converter (Q-DAC) circuit 235 which converts the quadrature channel 4 latched bits to a second analog signal. The output of the Q-DAC has $2^{(n/2)}$ possible output levels, in this case 16 possible output levels for the 4 input bits. Q-DAC is communicatively coupled to a quadrature-phase analog mixer 255.

A local oscillator (LO) 260 is coupled to a phase shifter circuit 265. Phase shifter 265 outputs a plurality of oscillating signals, the various oscillating signals being out of phase with one another respectively. For example and as illustrated, at a first output terminal 275 phase shifter outputs a reference signal (defined to be at a phase angle of 0°). For example the LO signal can be used directly as the reference signal provided to the in-phase channel as shown in FIG. 2A.

At a second output terminal 270 phase shifter outputs a phase delayed, or phase offset, representation of the input LO signal, defined here to be at a phase angle of 90°, delayed with respect to the reference signal. Cyclical signals may be represented by vectors rotating about an origin; therefore, the signal delayed by 90° at output terminal 270 may be referred to as being orthogonal to the reference signal since its representative rotating vector would be orthogonal to the rotating vector representation of the reference signal present at output terminal 275. The signal at the second output terminal 270 is therefore referred to as an orthogonal signal with respect to the reference signal at the first output terminal 275. First output terminal 275 is communicatively coupled to in-phase mixer 250 through a first buffer 277, and second output terminal 270 is communicatively coupled to quadrature-phase mixer 255 through a second buffer 273.

For each of the channels, the respective modulating analog signals from the channel's respective digital-to-analog converter are is-mixed in the respective mixer with the respective local oscillator signal. The reference LO signal from first output terminal 275 is modulated in mixer 250 by the analog signal from I-DAC representative of 4 of the 8 input digital data bits to form an in-phase modulated analog signal at mixer output terminal 252. The orthogonal LO signal from second output terminal 270 is modulated in mixer 255 by the analog signal from Q-DAC representative of the other 4 bits of the 8 input digital data bits to form an orthogonal modulated analog signal at mixer output terminal 257.

Mixer output terminal 252 and mixer output terminal 257 are respectively communicatively coupled to a summing circuit 280 which sums the in-phase modulated analog signal and the orthogonal modulated analog signal together and transmits the resultant signal as an analog output signal (e.g., a radio frequency (RF) signal) via buffer 285 to analog output terminal 290. Analog output terminal 290 is further coupled to an unequalized transmission medium (not shown in FIG. 2A) (e.g., unequalized transmission medium 130 of FIG. 1A). The analog output signal is given sufficient power necessary to traverse the length of the unequalized transmission medium according to a particular application.

The analog output signal, for example an RF signal, has 16 possible in-phase levels (states) and 16 possible quadrature levels. Due to the fact that the levels are orthogonally oriented to one another, the total number of possible states for the RF signal is the quantity of in-phase channel levels multiplied by the quantity of quadrature channels levels. In the exemplary embodiment illustrated in FIG. 2A each channel provides 16 ($2^4$) possible states; therefore, a total of 256 possible states are encoded upon the RF signal. Thereby, the RF signal contains the information of 8 digital data bits compressed into one analog "symbol" and the bandwidth requirement of the unequalized transmission medium is reduced by a factor of 8.

Figure 2B:
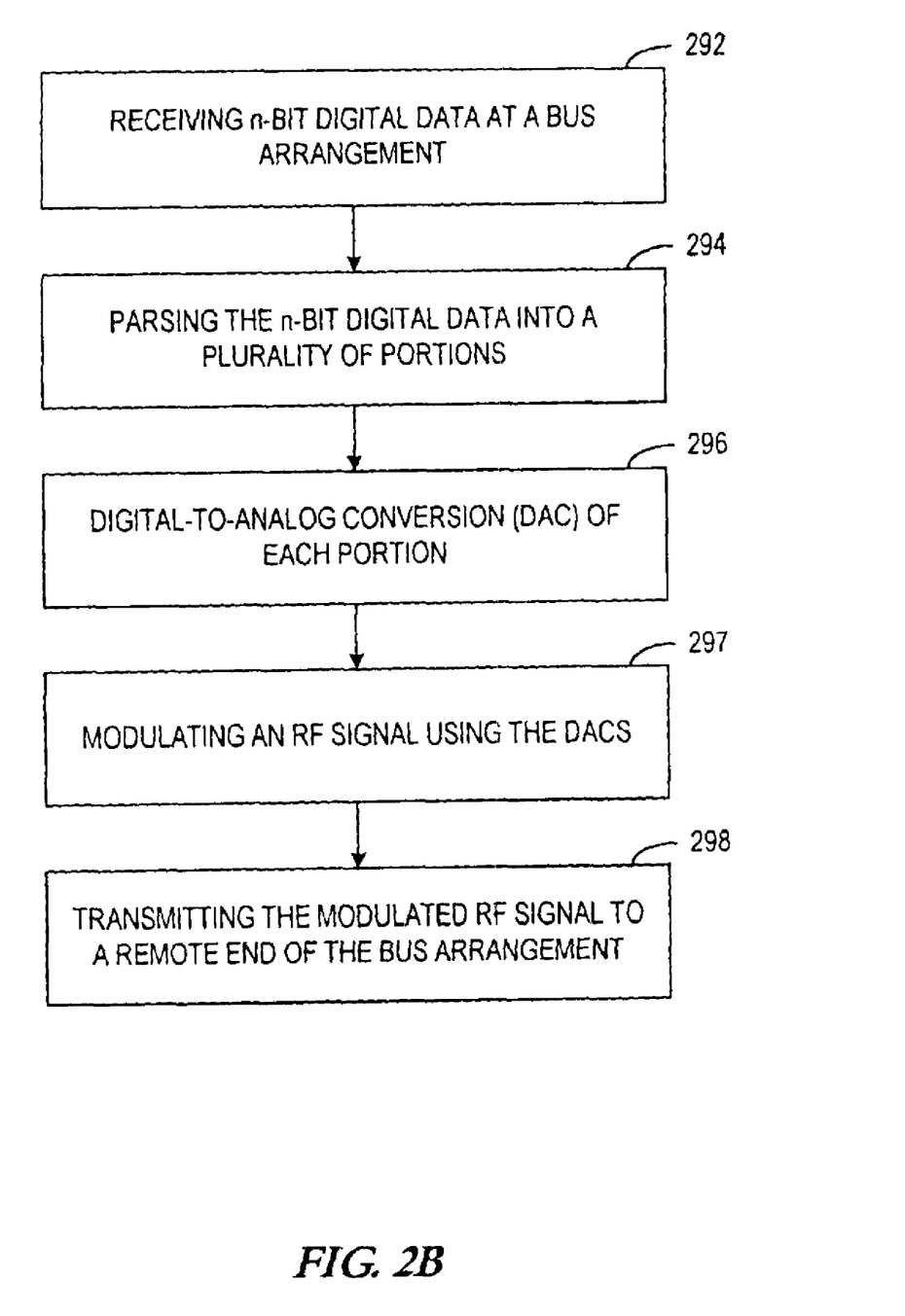
FIG. 2B is a flowchart of a process for analog encoding of digital data within a bus arrangement, according to an exemplary embodiment of the present invention.

FIG. 2B is a flowchart of a process for analog encoding of digital data within a bus arrangement, according to an exemplary embodiment of the present invention. First, n-bit digital data is received at the bus arrangement (step 292). The n-bit digital data is parsed into a plurality of portions (step 294) and each portion is converted into a corresponding analog modulating signal (step 296), for example via respective digital-to-analog conversion (DAC) processes. An analog input signal, e.g., an RF signal, is modulated using the corresponding analog modulating signals from the DAC processes (step 297). Thereafter, the modulated RF signal is transmitted to a remote end of the bus arrangement (step 298).

Figure 3A:
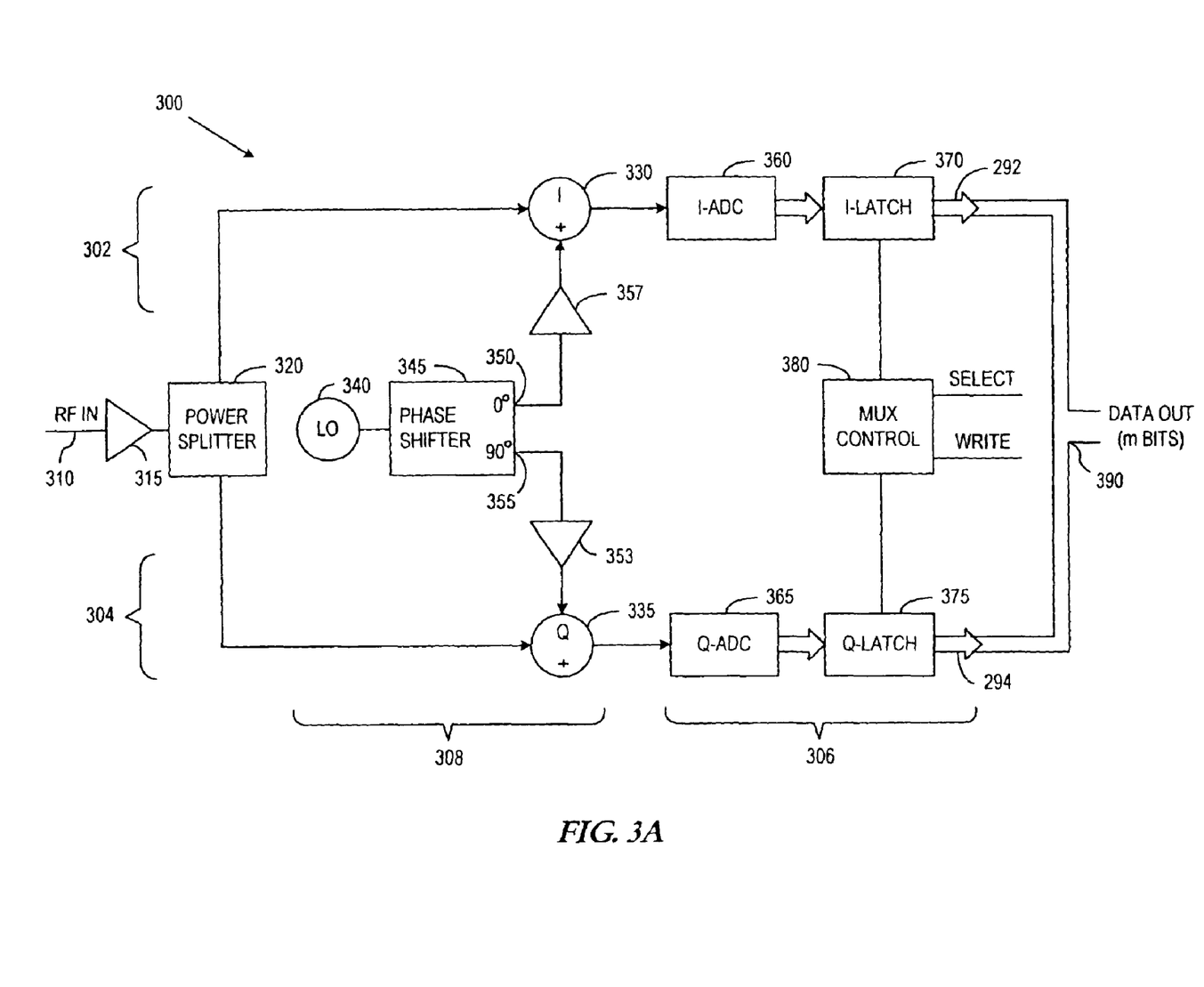
FIG. 3A is a block diagram that illustrates a decoder and analog-to-digital converter, according to an exemplary embodiment of the present invention.

FIG. 3A is a block diagram that illustrates a decoding circuit 300, according to an exemplary embodiment of the present invention. Decoding circuit 300 effectively operates as the reverse process of the encoding circuit. Decoding circuit 300 includes an analog-to-digital converter portion 306 and an analog decoder (portion) 308 for demodulating a received analog signal. The analog decoder uses the same technique as the corresponding encoding circuit, e.g., QAM, OFDM, or some other bandwidth-efficient coding scheme. Decoding circuit 300 has the same quantity of channels as the corresponding encoding circuit. Two channels are shown in FIG. 3A, an in-phase channel 302, and a quadrature-phase channel 304 (corresponding for illustration purposes to the two channels of QAM encoding of FIG. 2A).

The analog output signal (e.g., RF signal) transmitted from an encoding circuit is received on an analog input terminal 310 through buffer 315 to a power signal splitter 320. Analog input terminal 310 is communicatively coupled (not shown) to an unequalized transmission medium (if an equalizer is not used), or to an equalized transmission medium (if an equalizer is used). Splitter 320 splits the analog input signal into two signals. One of the two signals is used to extract the in-phase constituent signal and the second of the two signals is used to extract the quadrature-phase constituent signal, each constituent signal being directed to one of the two corresponding channels. Splitter 320 is communicatively coupled to an in-phase mixer 330 and to a quadrature-phase mixer 335.

A local oscillator (LO) 340 is coupled to a phase shifter circuit 345. Phase shifter 345 outputs a plurality of oscillating signals out of phase with one another, for example as illustrated, at a fast output terminal 350 phase shifter outputs a demodulation reference signal (defined to be at a phase angle of 0°). For example the LO signal can be used directly as the reference signal provided to the in-phase channel as shown in FIG. 3A At a second output terminal 355 phase shifter outputs a phase delayed, or phase offset, representation of the input LO signal, defined here to be at a phase angle of 90°, delayed with respect to the reference signal. The combination of local oscillator 340 and phase shifter 345 provides a reference signal to the in-phase channel and a quadrature signal to the quadrature channel in the same manner as described for encoding circuit 200. First output terminal 350 is communicatively coupled to in-phase mixer 330 through a first buffer 357, and second output terminal 355 is communicatively coupled to quadrature-phase mixer 335 through a second buffer 353.

For each channel, the respective constituent signal (i.e., in-phase signal for the in-phase channel to mixer 330) is mixed with the respective signal from the phase shifter to recover the respective channel's differential analog modulating signal. It will be appreciated by those having ordinary skill in the art that the respective decoding signals from the decoding circuit's LO are synchronized to the channel's incoming modulation signal and oriented in terms of phase relationship to effectively cancel out the carrier signal of the encoding circuit's LO. According to one more particular implementation of the present invention, the phase relationship of the encoding circuit local oscillator 260 and the decoding circuit local oscillator 340 are coordinated to achieve accurate decoding, for example by synching the respective oscillator signals to a common clock, or by also transmitting the encoding reference signal across the bus arrangement, or by some suitable other coordination method.

For the in-phase channel, mixer 330 is further communicatively coupled to an in-phase analog-to-digital converter (I-ADC) 360, and I-ADC is in turn communicatively coupled to an in-phase latching circuit 370. Similarly of the quadrature channel, mixer 335 is further communicatively coupled to a quadrature-phase analog-to-digital converter (Q-ADC) 365, and Q-ADC is in turn communicatively coupled to a quadrature-phase latching circuit 375. A multiplexing control circuit 380 is communicatively coupled to each of the latches, 370 and 375 respectively.

Each of the recovered differential analog modulating signals is processed through its respective analog-to-digital converter to produce representative 4 digital data bits respectively (assuming QAM 256 encoding of 8 digital data bits). The representative data bit buses (e.g., 4 bits wide), 292 and 294 respectively, are latched to form one 8-bit data bus 390. Alternatively, data may be latched to form an m-bit data bus where m is not equal to n, for example a 16-bit data bus, depending on application of the decoding circuit.

Figure 3B:
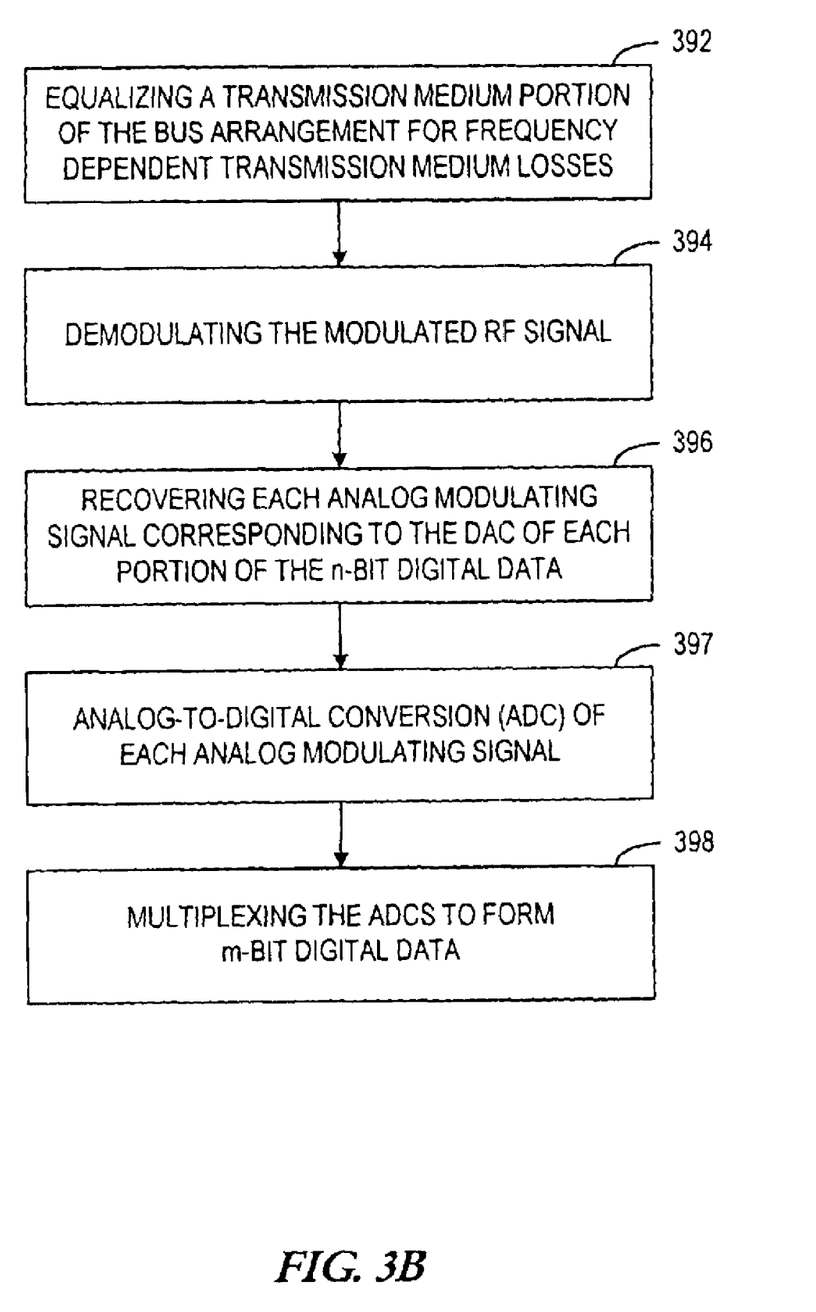
FIG. 3B is a flowchart of a process for analog decoding the digital data within a bus arrangement, according to an exemplary embodiment of the present invention.

FIG. 3B is a flowchart of a process for analog decoding the digital data within a bus arrangement, according to an exemplary embodiment of the present invention. A transmission portion of the bus arrangement is compensated to equalize frequency dependent transmission medium losses (step 392) and yield more consistent signal attenuation across the frequency spectrum. The particular compensation is application-dependant upon the transmission medium installation characteristics. The modulated analog output signal received is demodulated (step 394) and each analog modulating signal (corresponding to the digital-to-analog conversion signal from respective portions of the n-bit digital data) is thereafter recovered (step 396) and respectively converted from analog into a digital representation (step 397). Ideally the resulting digital data is equivalent to the input digital data portion from which the analog modulating signal was formed. The respective resulting digital data are multiplexed to form m-bit digital data (step 398), m being greater than or equal to one. Often, m will be configured to be equivalent to n, the input digital data width.

Figure 4:
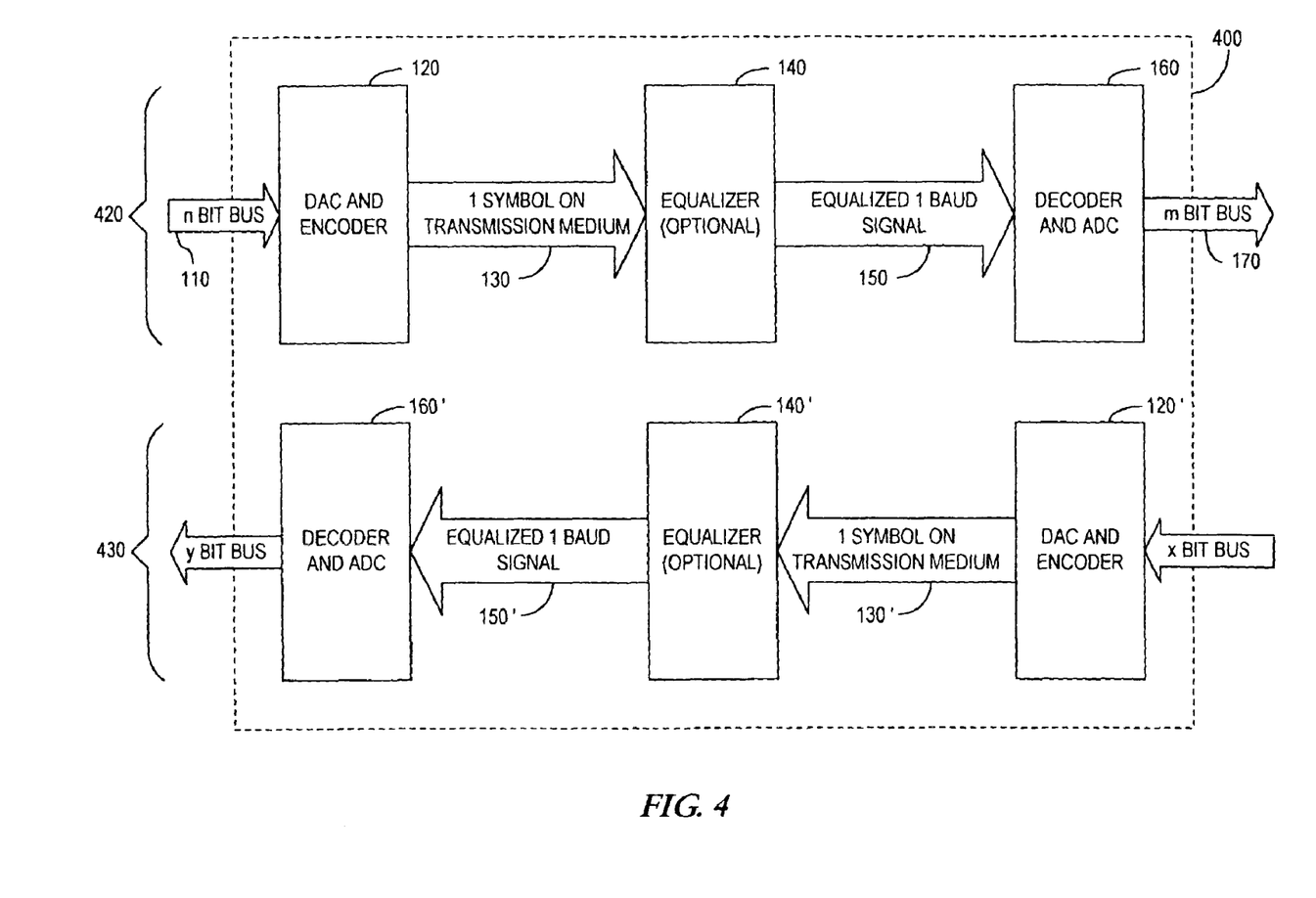
FIG. 4 is a block diagram that illustrates a bi-directional busing arrangement, according to an exemplary embodiment of the present invention.

FIG. 4 is a block diagram that illustrates a bi-directional bus arrangement 400, according to an exemplary embodiment of the present invention. Bus arrangement 400 includes two bus arrangements similar to that described in FIG. 1A, but each sub-bus arrangement operating in an opposite relative direction from the other. Bus arrangement 400 receives n-bit digital data on a first sub-bus arrangement 420, transmits information contained therein, and outputs the information as m-bit data. Generally, bus arrangement is configured such that m is equivalent to n; however they need not be identical integers. Bus arrangement 400 receives x-bit digital data on a second sub-bus arrangement 430, x being a positive integer, transmits information contained therein, and outputs the information as y-bit data, y being a positive integer. Generally, bus arrangement is configured such that y is equivalent to x; however they need not be identical. Furthermore, n may or may not be equivalent to x, and m may or may not be equivalent to y. However, in one particular embodiment of the invention, n, m, x and y are all equivalent.

Each sub-bus arrangement has an encoding circuit (120 and 120' respectively) communicatively coupled to an unequalized transmission medium (130 and 130' respectively), which in turn is optionally communicatively coupled to an equalizer (140 and 140' respectively), communicatively coupled to equalized transmission medium (150 and 150' respectively), and finally communicatively coupled to a decoding circuit (160 and 160' respectively).

Figure 5:
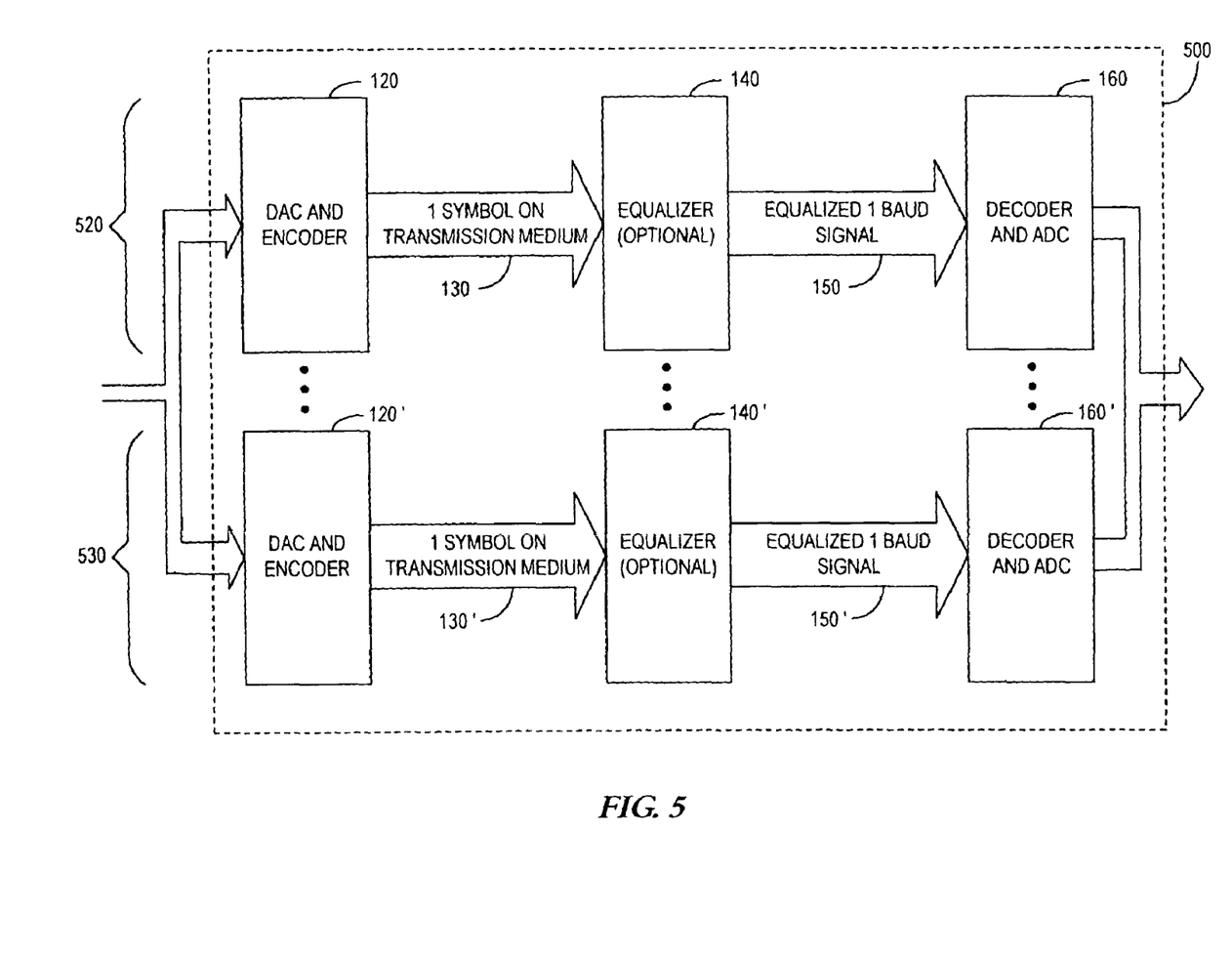
FIG. 5 is a block diagram that illustrates a unidirectional busing arrangement having multiple transmission paths, according to an exemplary embodiment of the present invention.

FIG. 5 is a block diagram that illustrates a multi-path unidirectional bus arrangement 500, according to an exemplary embodiment of the present invention. Bus arrangement 500 includes two sub-bus arrangements, 520 and 530, similar to that described in FIG. 1A, but operating in parallel in the same relative direction with each other. Each sub-bus arrangement has an encoding circuit (120 and 120' respectively) communicatively coupled to an unequalized transmission medium (130 and 130' respectively), which in turn is optionally communicatively coupled to an equalizer (140 and 140' respectively), communicatively coupled to equalized transmission medium (150 and 150' respectively), and finally communicatively coupled to a decoding circuit (160 and 160' respectively). Using multiple parallel paths in the same direction increases the overall bandwidth of the bus arrangement of the present invention. Although only two parallel paths in the same direction are shown in FIG. 5, the technique of expanding the bus arrangement of the present invention can be expanded to any number of parallel paths in a given direction. Furthermore, multiple unidirectional sub-bus arrangements as shown of FIG. 5 may be combined with the bi-directional circuit of FIG. 4 to derive a bi-directional bus arrangement, having multiple parallel paths in each direction.

The circuits of the present invention are scalable to higher speeds. The various component parts and circuits illustrated herein are presently in wide use in the GHz frequency range. Due to the density of possible states of an analog coding scheme, the components require only 1/n (e.g., 1/8 assuming 8-bit digital data) the bandwidth of similar base band transmission systems. Conversely, using the same type of transistors as used in a base band bus, the bus arrangement of the present invention (e.g., using QAM encoding/decoding) can run n times faster (e.g., 8 times faster assuming 8-bit digital data). The digital-to-analog converters (DACs) and analog-to-digital converters (ADCs) will scale in speed because they are narrow (e.g., 4 bits) and can be implemented for example, as flash ADCs.

The increase in data rate of the bus arrangement with no increase in the physical size of the transmission medium is achieved at the cost of complexity of the bus arrangement structure and more sensitivity to the signal-to-noise ratio versus conventional bus arrangements (e.g., a backplane trace). Additional transistors are required to implement the digital data conversion to analog, encoding, decoding and conversion back into a digital data form thereby increasing the complexity of the silicon implementing the components of the bus arrangement. However, as gate count per unit area increases in silicon, it becomes more advantageous to trade circuit count for bandwidth efficiency. Implementing an analog modulation scheme, along with the associated ADCs and DACs requires hundreds, or perhaps thousands (depending on the particular encoding scheme, digital data size, parallel paths, and other application-specific variables) more transistors for each signal path compared to a conventional simultaneous bi-directional bus that may require only tens of transistors for each signal path. For a 64- or 128-bit bus arrangement of the present invention, the total transistor count may reach a million on an ASIC. While this may seem like a large quantity, with 25 to 100 million transistors per ASIC today, the transistors required to implement the bus arrangement of the present invention is relatively minimal. Further miniaturization of components will continue to improve this ratio as well. Chip geographic efficiency is further increased when also accounting for the "real estate" saved by eliminating (n-1)/n of the transmission mediums (e.g., using one path instead of 8 parallel paths for 8-bit data). The tradeoff of increased silicon complexity for reduced bandwidth requirements of the transmission medium is advantageous, such as where less geographic area is consumed to implement the encoding and decoding circuits than is saved by reducing the parallel communication paths to a serial communication path having reduced bandwidth.

By using for example 256 possible levels per analog "symbol," the separation distance from one level to the next is decreased. This implies that the signal-to-noise ratio must be improved to maintain the same level of error free operation. The digital switching noise must be filtered and isolated from the analog circuitry (as indicated by the various buffers in the accompanying figures of this application). According to another implementation of the present invention, a constellation MAPPER (not shown) is used to minimize the effects of noise.

A constellation MAPPER is an additional layer of encoding that optimizes the relationship between each level (state) and that of adjacent levels (states). A simple example of a constellation MAPPER is the Gray code, where every state (i.e., location in the constellation) is at most one bit different from an adjacent state. This forces most errors to be single bit, thus easing the signal-to-noise requirements and simplifying error correction. For example considering the in-and quadrature-phases of QAM encoding, and 8-bit digital data, 256 possible states comprise the constellation. A constellation MAPPER is chosen that minimizes, or avoids, latency to the bus arrangement.

Latency generally refers to the time attributable to signal propagation delay through transmission media and associated circuitry. In certain applications, latency is an important system design factor. For example, latency associated with a bus arrangement between data storage and data processing circuits can increase memory cycle times, which in turn decreases processor efficiency. Although some latency is introduced through the various encoding and decoding circuits comprising the bus arrangement of the present invention, circuits that are not included in conventional busing schemes, overall bus arrangement latency is minimized in latency-sensitive applications through the use of RF circuitry and flash ADCs.

The bus arrangement of the present invention also eliminates skew problems associated with a source synchronous bus. Skew is relative between the individual signals (including the clock signal) of a parallel bus scheme. In a parallel bus, if the individual paths are not matched perfectly, the various signals will not arrive at the end of the bus at the same time. The data signals cannot be "received" (i.e., ascertained) until a clock signal is present. To compensate for skew, parallel path data rates are decreased to provide margin greater than the skew. In addition, skew problems between ends of a parallel data path can limit the geographic range of a clock domain or the maximum clock frequency. Skew problems are eliminated in the bus arrangement of the present invention due to its serial operation.

Figure 6:
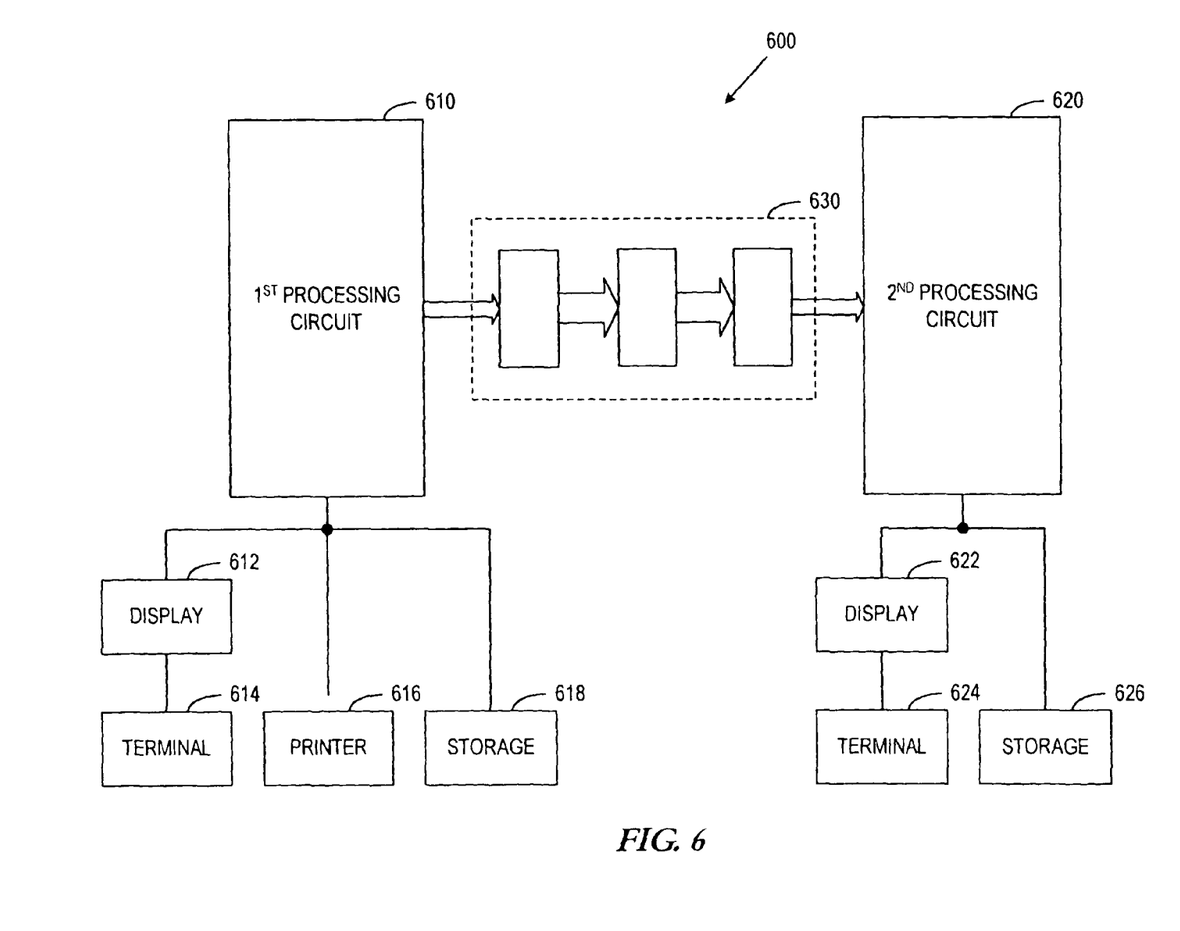
FIG. 6 is a block diagram that illustrates a computing system having a bus arrangement, according to an exemplary embodiment of the present invention.

FIG. 6 is a block diagram that illustrates a representative computing arrangement 600 having a bus arrangement, according to an exemplary embodiment of the present invention. Computing arrangement 600 includes a first processing circuit 610 communicatively coupled to a second processing circuit 620 via a bus arrangement 630. A respective processing circuit may include, for example, a computer, a computer system, card, board, chip, integrated circuit arrangement, logic unit, processing unit, electronic device, memory, data storage arrangement, semiconductor memory, a portion, region or component of any of the foregoing, or any other data manipulation circuit. According to another particular embodiment, computing arrangement 600 represents a mainframe computer that includes a data storage arrangement, e.g., a semiconductor memory arrangement, communicatively coupled to a processor via bus arrangement 630. For example, bus arrangement 636 traverses at least a portion of a backplane portion of the mainframe computer.

Furthermore, a respective processing circuit may be a data source, perform manipulations on received data, or simply be a conduit for data from another data processing circuit. Processing circuits may be further communicatively coupled to additional processing circuit(s), including data networks, communication systems, wireless networks, components, or any other mechanical or information network or system. The computing arrangement further may include peripheral devices coupled to either, or both, processing circuits. A display 612, man-machine interface (i.e., terminal) 614, printer 616 and data storage arrangement are optionally communicatively coupled to first processing circuit 610 as part of computing arrangement 600. Additionally, a display 622, terminal 624 and physical data storage device are optionally communicatively coupled to second processing circuit 620. Additional peripheral devices and systems beyond those shown in the illustrations may be optionally communicatively coupled to either processing system.

Bus arrangement 630 is communicatively coupled between the first and second processing circuits and has at least one encoding circuit, at least one decoding circuit and at least one transmission medium communicatively coupled between the encoding circuit and the decoding circuit. The at least one encoding circuit includes a digital-to-analog converter circuit communicatively coupled to a multi-phase analog encoding circuit. The at least one decoding circuit includes a multi-phase analog decoding circuit and a multiplexing circuit communicatively coupled to an analog-to-digital converter circuit.

Bus arrangement 630 may be any of the bus arrangements discussed or contemplated above. Although a single path, unidirectional bus arrangement is illustrated (similar to bus arrangement 100), bus arrangement may be configured unidirectionally, bi-directionally, with single or multiple transmission medium paths in a given direction. Bus arrangement 630 may be integral to the implementation of the processing circuits or external; wired or wireless, and function using electromagnetic signals including, but not limited to, electric, magnetic, sound, light, microwave, or other signals.

Accordingly, the present invention provides, among other aspects, a method and apparatus for communicating digital data via a bus arrangement. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A bus arrangement, comprising:
    at least one encoding circuit, each encoding circuit including a digital-to-analog converter circuit communicatively coupled to a multi-phase analog encoding circuit, wherein the multi-phase analog encoding circuit comprises an orthogonal analog encoding circuit which operates using orthogonal carriers;
    at least one decoding circuit, each decoding circuit corresponding to a respective encoding circuit and including a multi-phase analog decoding circuit communicatively coupled to an analog-to-digital converter circuit, and a multiplexing circuit communicatively coupled to the analog-to-digital converter circuit, wherein the multi-phase analog decoding circuit comprises an orthogonal analog decoding circuit which operates using orthogonal carriers;
    at least one transmission medium communicatively coupled between each respective encoding circuit and corresponding decoding circuit, and
    wherein the orthogonal analog encoding and decoding circuits respectively use quadrature amplitude modulation.

2. The bus arrangement of claim 1, wherein each multi-phase analog encoding circuit is arranged and configured to encode information onto a radio frequency carrier signal, and each decoding circuit is arranged and configured to extract information encoded onto a radio frequency carrier signal.

3. The bus arrangement of claim 1, wherein the orthogonal analog encoding and decoding circuits respectively use orthogonal frequency division multiplexing.

4. A bus arrangement, comprising:
    at least one encoding circuit, each encoding circuit including a digital-to-analog converter circuit communicatively coupled to a multi-phase analog encoding circuit;
    at least one decoding circuit, each decoding circuit corresponding to a respective encoding circuit and including a multi-phase analog decoding circuit communicatively coupled to an analog-to-digital converter circuit, and a multiplexing circuit communicatively coupled to the analog-to-digital converter circuit;
    at least one transmission medium communicatively coupled between each respective encoding circuit and corresponding decoding circuit; and
    wherein the bus arrangement is n-bits wide at its transmitting end, and the multi-phase analog encoding circuit has $2^n$ possible states per symbol, n being a positive integer.

5. The bus arrangement of claim 4, wherein the bus arrangement is m-bits wide at its receiving end, m being equal to n.

6. The bus arrangement of claim 4, wherein the bus arrangement is m-bits wide at its receiving end, m being a positive integer different than n.

7. A bus arrangement, comprising:
    at least one encoding circuit, each encoding circuit including a digital-to-analog converter circuit communicatively coupled to a multi-phase analog encoding circuit;
    at least one decoding circuit, each decoding circuit corresponding to a respective encoding circuit and including a multi-phase analog decoding circuit communicatively coupled to an analog-to-digital converter circuit, and a multiplexing circuit communicatively coupled to the analog-to-digital converter circuit;
    at least one transmission medium communicatively coupled between each respective encoding circuit and corresponding decoding circuit; and
    an equalizer circuit communicatively coupled between each of the encoding and corresponding decoding circuits wherein the equalizer circuit compensates for frequency dependent transmission medium losses.

8. The bus arrangement of claim 7, wherein the equalizer circuit comprises a lead-lag filter.

9. The bus arrangement of claim 7, wherein the equalizer circuit implements adaptive equalization.

10. The bus arrangement of claim 7, further comprising:
the equalizer circuit communicatively coupled between the transmission medium and the decoding circuit.

11. The bus arrangement of claim 7, wherein the at least one encoding circuit, the at least one decoding circuit and the at least one transmission medium are all implemented on a single common board.

12. The bus arrangement of claim 11, wherein the area to implement the bus arrangement is less than the area to implement an n-bit parallel transmission medium, n being a positive integer.

13. The bus arrangement of claim 7, wherein the bus arrangement is unidirectional.

14. The bus arrangement of claim 13, wherein the bus arrangement includes at least two of each of encoding circuits, decoding circuits, and transmission mediums operating in parallel.

15. A bus arrangement, comprising:
at least one encoding circuit, each encoding circuit including a digital-to-analog converter circuit communicatively coupled to a multi-phase analog encoding circuit;
at least one decoding circuit, each decoding circuit corresponding to a respective encoding circuit and including a multi-phase analog decoding circuit communicatively coupled to an analog-to-digital converter circuit, and a multiplexing circuit communicatively coupled to the analog-to-digital converter circuit;
at least one transmission medium communicatively coupled between each respective encoding circuit and corresponding decoding circuit; and
wherein the bus arrangement is bi-directional and includes at least two of each of encoding circuits, decoding circuits, and transmission mediums operating in parallel in each direction.

16. A bus arrangement, comprising:
at least one encoding circuit, each encoding circuit including a digital-to-analog converter circuit communicatively coupled to a multi-phase analog encoding circuit;
at least one decoding circuit, each decoding circuit corresponding to a respective encoding circuit and including a multi-phase analog decoding circuit communicatively coupled to an analog-to-digital converter circuit, and a multiplexing circuit communicatively coupled to the analog-to-digital converter circuit;
at least one transmission medium communicatively coupled between each respective encoding circuit and corresponding decoding circuit; and
further including a constellation MAPPER.

17. A bus arrangement, comprising:
at least one encoding circuit, each encoding circuit including a digital-to-analog converter circuit communicatively coupled to a multi-phase analog encoding circuit;
at least one decoding circuit, each decoding circuit corresponding to a respective encoding circuit and including a multi-phase analog decoding circuit communicatively coupled to an analog-to-digital converter circuit, and a multiplexing circuit communicatively coupled to the analog-to-digital converter circuit;
at least one transmission medium communicatively coupled between each respective encoding circuit and corresponding decoding circuit; and
wherein the transmission medium is a backplane trace.

18. A bus arrangement, comprising:
at least one encoding circuit, each encoding circuit including a digital-to-analog converter circuit communicatively coupled to a multi-phase analog encoding circuit;
at least one decoding circuit, each decoding circuit corresponding to a respective encoding circuit and including a multi-phase analog decoding circuit communicatively coupled to an analog-to-digital converter circuit, and a multiplexing circuit communicatively coupled to the analog-to-digital converter circuit;
at least one transmission medium communicatively coupled between each respective encoding circuit and corresponding decoding circuit; and
wherein the transmission medium is a crossbar switch.

19. A bus arrangement, comprising:
at least one encoding circuit, each encoding circuit including a digital-to-analog converter circuit communicatively coupled to a multi-phase analog encoding circuit;
at least one decoding circuit, each decoding circuit corresponding to a respective encoding circuit and including a multi-phase analog decoding circuit communicatively coupled to an analog-to-digital converter circuit, and a multiplexing circuit communicatively coupled to the analog-to-digital converter circuit;
at least one transmission medium communicatively coupled between each respective encoding circuit and corresponding decoding circuit; and
wherein the encoding circuit and decoding circuits are respectively implemented in application specific integrated circuits.

20. The bus arrangement of claim 19, wherein the digital-to-analog converter circuits and the analog-to-digital converter (ADCs) circuits are respectively implemented as flash ADC circuits.

21. A computing arrangement, comprising:
a first processing circuit;
a second processing circuit; and
a bus arrangement communicatively coupled between the first and second processing units, the bus arrangement including:
at least one encoding circuit, each encoding circuit including a digital-to-analog converter circuit communicatively coupled to a multi-phase analog encoding circuit,
at least one decoding circuit, each decoding circuit including an multi-phase analog decoding circuit communicatively coupled to an analog-to-digital converter circuit, and a multiplexing circuit communicatively coupled to the analog-to-digital converter circuit,
at least one transmission medium communicatively coupled between the encoding circuit and the decoding circuit; and
an equalizer circuit communicatively coupled between each of the encoding and corresponding decoding circuits wherein the equalizer circuit compensates for frequency dependant transmission medium losses.

22. A method of communicating n-bit digital data across a computer's internal bus arrangement, comprising:
converting the n-bit digital data into a representative analog modulating signal;
modulating an analog carrier signal using the representative analog modulating signal;
transmitting the analog carrier signal to a remote end of the bus arrangement;
at the remote end, demodulating the analog carrier signal;
recovering the representative analog modulating signal from the demodulated analog carrier signal;

reconstituting the n-bit digital data from the representative analog modulating signal; and compensating the internal bus arrangement to equalize frequency dependant losses of a transmission medium portion.

23. The method of claim 22, wherein the analog carrier signal comprises a radio frequency signal.

24. A method of communicating n-bit digital data received at a bus arrangement, comprising:

parsing the digital data into a plurality of portions;

converting each portion into a corresponding analog modulating signal;

using the corresponding analog modulating signals, modulating an analog carrier signal;

transmitting the modulated analog carrier signal to a remote end of the bus arrangement;

at the remote end, demodulating the modulated analog carrier signal;

recovering each corresponding analog modulating signal from the demodulated analog carrier signal;

converting each corresponding analog modulating signal to a respective digital data portion; and multiplexing the respective digital data portions to form m-bit digital data.

25. The method of claim 24, wherein the analog carrier signal is a radio frequency signal.

26. The method of claim 24, further comprising equalizing a transmission medium portion of the bus arrangement for frequency dependent transmission medium losses.

27. The method of claim 24, wherein m equals n.

28. The method of claim 24, wherein n-bit digital data is received at one end of the bus arrangement and transmitting is unidirectional.

29. The method of claim 24, wherein n-bit digital data is received at each end of the bus arrangement and transmitting is bi-directional.

30. The method of claim 24, wherein the digital data is parsed into two portions and the analog carrier signal is orthogonally modulated.

31. The method of claim 30, wherein the analog carrier signal is orthogonally modulated using quadrature amplitude modulation.

32. The method of claim 30, wherein the analog carrier signal is orthogonally modulated using orthogonal frequency division multiplexing.

33. A bus arrangement for communicating n-bit digital data to a remote end, comprising:

means for parsing the digital data into a plurality of portions;

means for converting each portion into a corresponding analog modulating signal;

means for modulating an analog carrier signal using the corresponding analog modulating signals;

means for transmitting the modulated analog carrier signal to a remote end of the bus arrangement;

means for demodulating the analog carrier signal at the remote end;

means for recovering each corresponding analog modulating signal from the demodulated analog carrier signal;

means for converting each corresponding analog modulating signal to a respective digital data portion; and means for multiplexing the respective digital data portions to form m-bit digital data.

34. The method of claim 33, wherein the analog carrier signal comprises a radio frequency signal.

* * * * *